United States Patent

Bruce et al.

[11] Patent Number: 5,609,665
[45] Date of Patent: Mar. 11, 1997

[54] METHOD OF MAKING OPTICAL FIBER WITH LOW MELTING GLASS CORE

[75] Inventors: Allan J. Bruce, Westfield; David J. DiGiovanni, Montclair, both of N.J.

[73] Assignee: Lucent Technologies Inc., Murray Hill, N.J.

[21] Appl. No.: 521,934

[22] Filed: Aug. 31, 1995

[51] Int. Cl.$^6$ .................................................. C03B 37/012
[52] U.S. Cl. ........................... 65/379; 65/389; 65/401; 65/404; 65/45
[58] Field of Search ........................... 65/404, DIG. 11, 65/390, 389, 401, 379, 45, 382

[56] References Cited

U.S. PATENT DOCUMENTS

| | | | |
|---|---|---|---|
| 4,063,914 | 12/1977 | Roeder | 65/401 |
| 4,277,270 | 7/1981 | Krohn | 65/404 |
| 4,682,995 | 7/1987 | Clasen | 65/401 |
| 5,106,400 | 4/1992 | Tick . | |
| 5,160,521 | 11/1992 | Tran | 65/404 |

FOREIGN PATENT DOCUMENTS

| | | | |
|---|---|---|---|
| 55-46979 | 11/1980 | Japan | 65/404 |
| 57-35131 | 7/1982 | Japan | 65/404 |
| 2020057 | 8/1982 | United Kingdom . | |

*Primary Examiner*—John Hoffmann
*Attorney, Agent, or Firm*—Oleg E. Alber; Eugen E. Pacher

[57] ABSTRACT

The disclosed method of making a mixed glass optical fiber exemplarily comprises providing a high-silica tube, and causing molten non-high silica glass to flow into the bore of the tube by application of a pressure differential. In order to prevent cracking, the tube desirably has an outer diameter/inner diameter ratio of at least 5, preferably about 10 or even more, and an inner diameter of at most 1 min. In a preferred embodiment, a conventional $SiO_2$ tube is partially collapsed to an inner diameter less than 1 mm, a quantity of a non-high-silica glass is placed in a neck of the partially collapsed tube and heated such that molten glass communicates with the reduced-diameter portion of the bore and can be drawn into the reduced-diameter portion by means of a vacuum. The resulting mixed glass body is then further stretched to result in a core rod of core diameter at most 0.3 min. After overcladding the core rod with $SiO_2$, fiber is drawn from the thus produced preform. A thus produced fiber with $SiO_2$ cladding and $SiO_2$-$Al_2O_3$-$La_2O_3$-$Er_2O_3$ core was used as an optical fiber amplifier and provided high gain.

9 Claims, 2 Drawing Sheets

METHOD OF MAKING OPTICAL FIBER WITH LOW MELTING GLASS CORE

FIELD OF THE INVENTION

This invention pertains to methods of making optical fiber.

BACKGROUND OF THE INVENTION

Silica-based optical fibers are in widespread use and perform admirably in most respects. However, for some applications it would be desirable to have available a mixed-glass fiber, i.e., a fiber with high-silica (i.e. greater than 85 mole %, frequently greater than 95% silica) cladding and a non-high-silica ($\leq$85% silica) core.

For example, to date attempts to dope the core of high-silica optical fibers with very high levels (e.g., several mole percent) of rare earth (atomic numbers 57–71) ions have been unsuccessful. Yet such highly doped fibers would be useful for very short fiber lasers, amplifiers and optical isolators. On the other hand, it is known that, for instance, sodium silicates and aluminosilicates allow very high (up to about 10 mole %) rare earth doping, and chalcogenide glasses are known to be excellent hosts for praseodymium for optical amplifiers.

Those skilled in the art will recognize that it would at best be impractical to combine non-silica-based fibers with conventional silica-based fibers. For instance, it would be difficult to effect a fusion splice between such dissimilar fibers. Thus, it would be desirable to have available a technique for making mixed glass fibers, i.e., fibers with non-high-silica (NHS) core and high-silica (HS) cladding.

Several techniques of making mixed material fibers have been disclosed. For instance, UK patent GB 2,020,057 (T. Kobayashi et al.) discloses providing a preform consisting of a drawable glass cladding tube and molten core material in the tube, and drawing fiber from the preform. The core material is an inorganic crystalline material (e.g., LiF) when solid. In a second embodiment the UK patent discloses a double crucible technique. U.S. Pat. No. 5,160,521 discloses making a mixed glass preform by heating a quantity of core glass to the core glass softening temperature and forcing a cladding tube into the softened core glass such that the core glass fills the cladding tube without bubbles or other defects. Fiber is drawn from the thus produced preform. U.S. Pat. No. 5,106,400 discloses a method and apparatus for forming a glass preform from core and cladding glasses having low liquidus viscosities and narrow working ranges.

Despite the prior art efforts, there is still need for a simple, reliable method of making glass fibers with HS cladding and NHS core. This application discloses such a method. The method can be used to make fibers that combine glasses of widely dissimilar thermal properties and composition, which frequently cannot be made by prior art methods.

SUMMARY OF THE INVENTION

The invention is embodied in a process of making optical fibers comprising a first glass (typically non-high-silica glass) core and a second glass (typically high-silica glass) cladding. An important aspect of the inventive method is a difference in viscosity between the first and second glasses at an appropriate working temperature, with the first glass having a softening temperature lower than the softening temperature of the second glass. Typically the difference in viscosity is such that the first glass has relatively low viscosity (is "molten") at the appropriate working temperature, whereas the second glass is relatively rigid at that temperature.

More specifically, the inventive method comprises making a preform that comprises a first glass core and a second glass cladding surrounding the core, and drawing optical fiber from the preform. Significantly, making the preform comprises providing a second glass tubular body having a bore, providing a quantity of the first glass, heating the quantity such that at least a portion thereof is at or above the first glass softening temperature and is in communication with the bore, and creating in the bore of the tubular body a pressure differential that is effective for causing at least some of the first glass to flow into the bore, such that a mixed glass body results.

Typically the relevant part of the second glass tubular body has an outside/inside diameter ratio of at least 5 (preferably about 10 or even more), and an inside diameter of no more than 1 mm, both in order to avoid cracking of the mixed glass body upon cooling.

Exemplarily, the second glass tubular body is made by partially collapsing at least a portion of a second glass starting tube such that a tubular body with a reduced-diameter section results. However, the second glass tubular body can be an appropriately dimensioned uniform tube, provided care is taken to eliminate flaws at the surface of the bore, and provisions are made for confining the molten first glass prior to its introduction into the bore.

In currently preferred embodiments the thus produced mixed glass body is stretched such that the first glass core is further reduced in diameter, exemplarily to a diameter of 0.3 mm or less. This reduction can further contribute to the prevention of cracking. The resulting preform rod is typically overclad in known manner with second glass to get the desired clad/core ratio, and fiber is drawn from the thus produced preform.

BRIEF DESCRIPTION OF THE DRAWINGS

More specifically, FIG. 1 shows a conventional silica tube; FIG. 2 shows the intermediate tube that results from partial collapse of a portion of the silica tube; FIG. 3 shows the intermediate tube with a quantity of core glass therein; FIG. 4 shows the intermediate tube with molten core glass drawn into the partially collapsed portion thereof; FIG. 5 illustrates the optional process step of stretching of the intermediate tube with the core glass therein; FIG. 6 illustrates the optional process step of overcladding of the core rod made from the intermediate tube with the core glass therein.

DETAILED DESCRIPTION OF A PREFERRED EMBODIMENT

Figure 1:
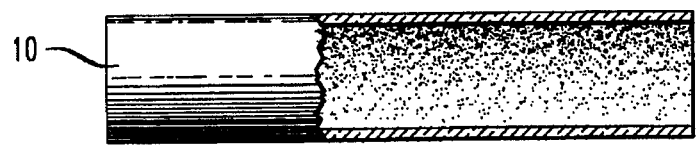
FIGS. 1–6 schematically depict a currently preferred exemplary embodiment of the inventive process. Objects are not drawn to size or in proportion.

FIG. 1 shows a conventional silica tube 10. Exemplarily the tube has 25 mm outer diameter and 19 mm inner diameter.

Figure 2:
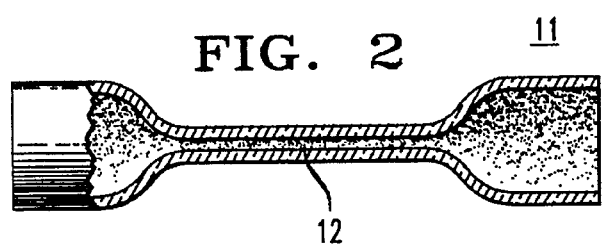

FIG. 2 shows the intermediate tube 11 that results from partial collapse of the starting tube. Typically the starting tube is mounted in a glass blower's lathe and the center portion of the tube is heated in conventional fashion. Exemplarily the outside diameter of the partially collapsed center portion of the tube is about 15.5 mm and the bore (12) diameter thereof is less than about 1 mm.

The core glass is produced by a conventional technique, e.g., melting of the starting materials in a platinum crucible. It can be any NHS glass that meets the above-discussed thermal requirements. Exemplarily the first glass is a chalcogenide glass or a sodium or alumino silicate. First glasses typically "melt" at temperatures below about 1500° C., and thus have sufficiently low viscosity at about 1500° C. to readily flow under a moderate applied force.

Since low viscosity and high thermal expansion generally go hand in hand in glasses, the first glasses of interest herein typically have relatively high thermal expansion coefficients, frequently more than 10 times that of silica. This mismatch of thermal properties between typical HS glasses and typical NHS glasses has made it difficult to produce mixed glass optical fibers by prior art processes. For instance, the high thermal expansion of typical core glasses frequently has led to cracking of preforms, and the high processing temperature of silica (typically >2000° C.) has caused boiling of the core glasses. The instant method can substantially overcome these difficulties, and is not limited to use with HS second glasses.

Figure 3:
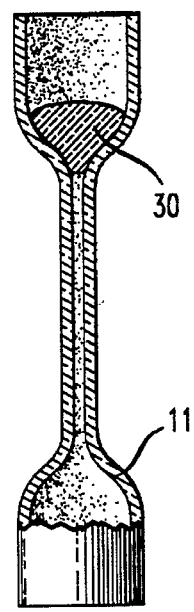
Figure 4:
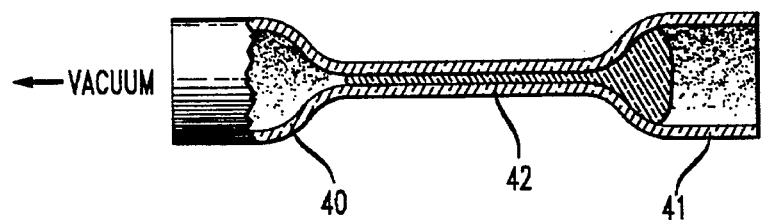

An appropriate quantity (30) of the first glass is placed into the neck of the intermediate tube, as shown in FIG. 3. The intermediate tube is then heated (typically in a glass blower's lathe) to a temperature (at or above the softening temperature of the first glass but below the softening temperature of the second glass) at which the first glass has sufficiently low viscosity such that all or part of the first glass can be caused to flow into the reduced diameter bore (12) of the intermediate tube by a pressure differential across the intermediate tube. The pressure differential exemplarily is created by means of a vacuum pump connected to end 40 of the intermediate tube, as schematically indicated in FIG. 4. Other means for creating the pressure differential are also contemplated. For instance, pressure can be applied (by means of, e.g., pressurized air) at end 41 of the intermediate tube, or vacuum and pressure can be applied simultaneously.

FIG. 4 shows that first glass 42 has been caused to move into the reduced-diameter portion of the bore. Since the partial collapse of the starting tube by necessity is carried out at relatively high temperature, the surface of the reduced-diameter portion typically is substantially free of defects. Consequently the low viscosity first glass can form a substantially defect free interface with the intermediate tube.

Figure 5:
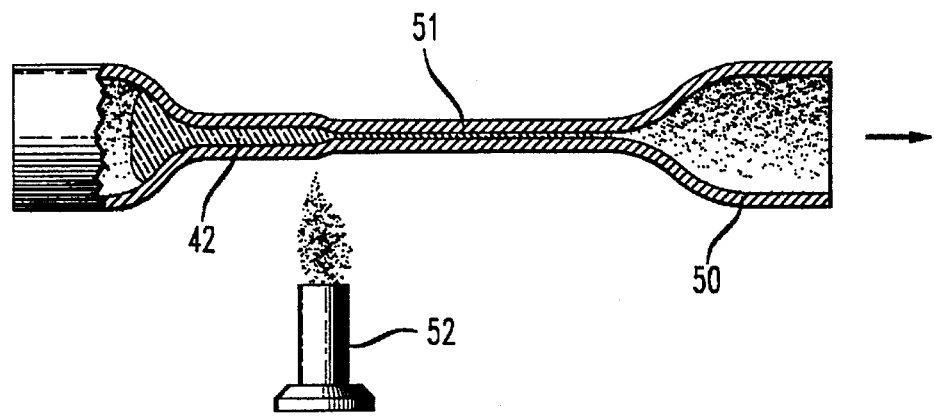
Figure 6:
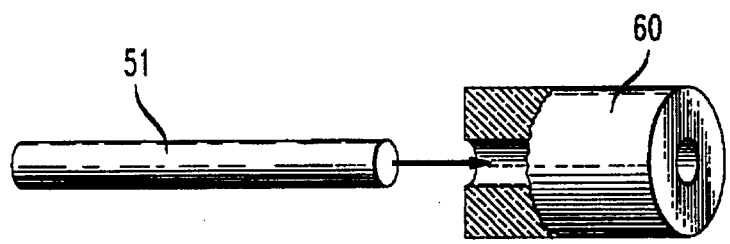
Figure 7:
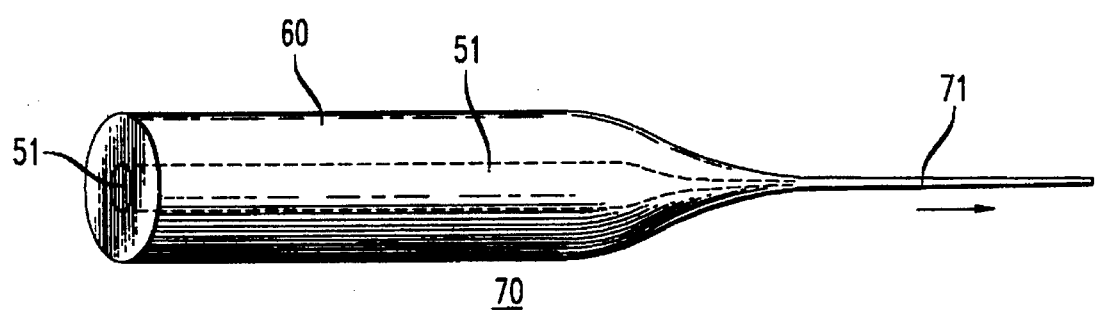
FIG. 7 illustrates the process step of drawing optical fiber from the preform that results from overcladding of the core rod.

In order to prevent core cracking during cool-down, it is generally desirable to stretch the central portion of the thus produced body to a smaller diameter, as shown schematically in FIG. 5. The stretching can be accomplished in conventional fashion, utilizing a heat source 52. Exemplarily, the outer diameter of the central portion of the body is reduced from about 15.5 mm to about 4 mm. Since the core material typically is substantially free of defects, bubbles typically do not form or grow during stretching of the body, and the body may be heated far above the vaporization temperature of the first glass.

After removal of the end pieces (e.g., 50) and/or cutting of preform rod 51 to the required length, the preform rod typically is inserted into an overclad tube 60 in conventional fashion, or is overclad by any other appropriate technique. The radial dimensions of the overclad are selected to yield, after drawing of fiber from the thus produced preform 70, fiber 71 having the desired core diameter and cladding/core ratio.

EXAMPLES

A quantity of NHS glass of molar composition 65% $SiO_2$-25% $Al_2O_3$-9.6$La_2O_3$-0.4$Er_2O_3$ was prepared in conventional fashion by melting of appropriate quantities of the starting oxides in a crucible. This composition is a member of the class of compositions disclosed in the concurrently filed co-assigned patent application by A. J. Bruce et al., entitled "Optical Device and Process of Making the Device". The central portion of a 19×25 mm diameter silica starting tube was partially collapsed to 15.5 mm outer diameter, leaving a bore of 0.7 mm diameter. The partial collapse was carried out in standard fashion on a glass blower's lathe. The thus produced intermediate tube was removed from the lathe, and about 0.5 g of the prepared NHS glass was placed into one of the neck regions of the tube and heated to about 1300° C.

The intermediate tube was remounted on the lathe, and a conventional vacuum pump was connected to the other neck region of the intermediate tube. Next the tube was heated such that the reduced-diameter central part of the tube and the one neck region were at about 1400° C. The other neck region was then evacuated such that a pressure differential existed in the tube, and the "molten" non-high-silica glass was drawn into the bore of the reduced diameter section to a length of about 12 cm. Next, while maintaining the unstretched central portion of the resulting body at about 800° C. to prevent cracking, the central portion was stretched in conventional fashion to 4.5 mm outside diameter, resulting in a core diameter of 0.23 mm. Cracking was observed for core diameters greater than about 0.3 mm, but it may be possible to find conditions which permit larger core sizes. After completion of stretching the end portions of the body were removed such that a core rod of substantially uniform diameter resulted. This core rod was then overclad with $SiO_2$ in conventional fashion to yield a 14 mm outer diameter preform, and optical fiber was drawn from the preform in conventional manner. The core/cladding index difference of the fiber was about 4.2%, and the core diameter was about 2.1 μm.

A 23 cm length of the fiber was configured as an optical amplifier in known manner. When pumped with 250 mW of 980 nm light from a Ti:sapphire laser, the amplifier provided 23 dB gain at 1533 nm. This is, to the best of our knowledge, the highest gain per unit fiber length reported to date.

By a method substantially as described, an optical fiber having an alkalisilicate core ($K_2O$-4$SiO_2$-0.05$Er_2O_3$-0.1$GeO_2$) and silica cladding was produced, as was a preform having a chalcogenide glass core and an aluminosilicate cladding.

As is known, the addition of one or more alkalis to a glass (e.g., to a glass with high rare earth content) can result in reduced viscosity. For this reason it may at times be advantageous to add an alkali (or alkalis) to a core glass, since the resulting reduced viscosity can facilitate drawing the molten core glass into the bore of the intermediate tube.

The invention claimed is:

1. Method of making an optical fiber comprising making a preform that comprises a first glass core and a second glass cladding surrounding the core, and drawing the optical fiber from the preform, the first and second glass each having a softening temperature, with the first glass softening temperature being lower than the second glass softening temperature;

CHARACTERIZED IN THAT said making a preform comprises the steps of
  a) providing a starting tube comprising second glass and having a bore, and partially collapsing at at least a portion of the starting tube;

b) providing a quantity of said first glass, and heating the quantity such that at least a portion thereof is at or above the first glass softening temperature and is in communication with said bore; and c) creating in said bore a pressure differential that is effective for causing at least some of the heated first glass to flow into said bore, the resulting body to be referred to as the mixed glass body.

2. Method according to claim 1, further comprising stretching at least a portion of the mixed glass body.

3. Method according to claim 1, further comprising overcladding at least a portion of the mixed glass body with a quantity of a third glass.

4. Method according to claim 3, wherein the third glass has substantially the same composition as the second glass.

5. Method of claim 4 wherein the second glass consists substantially of $SiO_2$, and the first glass contains less than 85 mole % $SiO_2$.

6. Method of claim 5 wherein the first glass is selected from the group consisting of chalcogenide glasses, sodium silicate glasses and alumino-silicate glasses.

7. Method according to claim 1, wherein the pressure differential is created by at least partial evacuation of at least a portion of the bore.

8. Method according to claim 1, wherein said starting tube is a uniform second glass tube of inner diameter at most 1 mm.

9. Method according to claim 1, wherein i) said starting tube is a substantially uniform $SiO_2$ tube of inner diameter greater than 1 mm, and step a) comprises partially collapsing at least a portion of the starting tube to an inner diameter of at most 1 mm, said at least portion of the starting tube to be referred to as the "reduced-diameter portion" of the starting tube;

ii) step c) comprises at least partial evacuation of the reduced-diameter portion of the starting tube;

iii) subsequent to step c), at least a portion of the reduced-diameter portion of the starting tube is stretched to result in a core rod of core diameter at most 0.3 mm; and iv) at least a portion of the core rod is overclad with $SiO_2$, the resulting overclad core rod being the preform.

* * * * *